US012726353B2

(12) United States Patent
Iinami et al.

(10) Patent No.: US 12,726,353 B2
(45) Date of Patent: Sep. 1, 2026

(54) CONTROL SYSTEM AND VEHICLE

(71) Applicant: SUBARU CORPORATION, Tokyo (JP)

(72) Inventors: Hisataro Iinami, Tokyo (JP); Yusuke Komatsu, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 122 days.

(21) Appl. No.: 18/979,893

(22) Filed: Dec. 13, 2024

(65) Prior Publication Data

US 2025/0112775 A1 Apr. 3, 2025

Related U.S. Application Data

(63) Continuation of application No. PCT/JP2023/011933, filed on Mar. 24, 2023.

(51) Int. Cl.

| | |
|---|---|
| ***H04L 9/32*** | (2006.01) |
| ***H04L 9/08*** | (2006.01) |
| ***H04L 9/14*** | (2006.01) |

(52) U.S. Cl.

CPC .............. *H04L 9/32* (2013.01); *H04L 9/0861* (2013.01); *H04L 9/0894* (2013.01); *H04L 9/14* (2013.01)

(58) Field of Classification Search

CPC ....... H04L 9/32; H04L 9/0861; H04L 9/0894; H04L 9/14

See application file for complete search history.

(56) References Cited

U.S. PATENT DOCUMENTS

| | | | | |
|---|---|---|---|---|
| 9,953,322 | B2 * | 4/2018 | Lee | G06Q 20/102 |
| 2017/0134164 | A1 * | 5/2017 | Haga | G06F 21/445 |

(Continued)

FOREIGN PATENT DOCUMENTS

| | | |
|---|---|---|
| JP | 2017-130908 A | 7/2017 |
| JP | 2018-196080 A | 12/2018 |

(Continued)

OTHER PUBLICATIONS

International Search Report (with English translation) and Written Opinion dated Jun. 13, 2023, from International Application No. PCT/JP2023/011933, 12 pages.

*Primary Examiner* — Ayoub Alata
(74) *Attorney, Agent, or Firm* — Rimon P.C.

(57) ABSTRACT

A control system includes a first processor and a second processor. The first processor includes: first security circuitry configured to hold a first encryption key and permit limited access from an external device; and first storage circuitry. The second processor includes: second security circuitry configured to hold a second encryption key and permit limited access from the external device; and second storage circuitry. The first processor is configured to: generate an authentication key to be used for authentication processing; supply the authentication key to the second processor; generate a first authentication key by encrypting the authentication key using the first encryption key; and store the first authentication key in the first storage circuitry. The second processor is configured to: generate a second authentication key by encrypting the authentication key supplied from the first processor using the second encryption key; and store the second authentication key in the second storage circuitry.

2 Claims, 6 Drawing Sheets

(56) References Cited

U.S. PATENT DOCUMENTS

2019/0028267 A1* 1/2019 Takemori .............. H04L 9/3242
2021/0160064 A1 5/2021 Harata et al.
2022/0123938 A1* 4/2022 Lee ....................... H04L 9/0897

FOREIGN PATENT DOCUMENTS

JP 2020-028120 A 2/2020
JP 2021-135817 A 9/2021
WO 2016/075865 A1 5/2016

* cited by examiner

CONTROL SYSTEM AND VEHICLE

CROSS-REFERENCE TO RELATED APPLICATIONS

This application is continuation of International Application No. PCT/JP2023/011933, filed on Mar. 24, 2023, the entire contents of which are hereby incorporated by reference.

BACKGROUND

The disclosure relates to a control system that performs authentication processing using authentication keys and to a vehicle including the control system.

Most electronic devices employ a technique of increasing security using keys. For example, Japanese Unexamined Patent Application Publication No. 2020-028120 discloses a method of managing a security access key in a vehicle master device.

SUMMARY

An aspect of the disclosure provides a control system including a first processor and a second processor. The first processor includes first security circuitry and first storage circuitry. The first security circuitry is configured to hold a first encryption key and permit limited access from an external device. The second processor includes second security circuitry and second storage circuitry. The second security circuitry is configured to hold a second encryption key and permit limited access from the external device. The first processor is configured to generate an authentication key to be used for authentication processing performed between the first processor and the second processor, in accordance with an instruction from an external apparatus. The first processor is configured to supply the authentication key to the second processor. The first processor is configured to generate a first authentication key by encrypting the authentication key using the first encryption key. The first processor is configured to store the first authentication key in the first storage circuitry. The second processor is configured to generate a second authentication key by encrypting the authentication key supplied from the first processor using the second encryption key. The second processor is configured to store the second authentication key in the second storage circuitry.

An aspect of the disclosure provides a vehicle including a control system. The control system includes a first processor and a second processor. The first processor includes an electronic control unit configured to control the vehicle. The electronic control unit includes first security circuitry and first storage circuitry. The first security circuitry is configured to hold a first encryption key and permit limited access from an external device. The second processor includes second security circuitry and second storage circuitry. The second security circuitry is configured to hold a second encryption key and permit limited access from the external device. The electronic control unit is configured to generate an authentication key to be used for authentication processing performed between the electronic control unit and the second processor, in accordance with an instruction from an external apparatus. The electronic control unit is configured to supply the authentication key to the second processor. The electronic control unit is configured to generate a first authentication key by encrypting the authentication key using the first encryption key. The electronic control unit is configured to store the first authentication key in the first storage circuitry. The second processor is configured to generate a second authentication key by encrypting the authentication key supplied from the electronic control unit using the second encryption key. The second processor is configured to store the second authentication key in the second storage circuitry.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
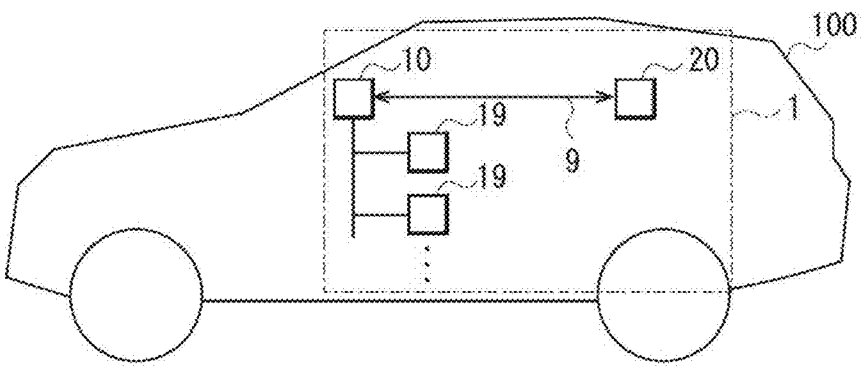
FIG. 1 is an explanatory diagram illustrating a configuration example of a control system according to one example embodiment of the disclosure.

A control system is desired to achieve high convenience while enhancing security, with expectation for further improvement in the convenience.

It is desirable to provide a control system and a vehicle that each make it possible to achieve high convenience while enhancing security.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

EXAMPLE EMBODIMENT

Configuration Example

FIG. 1 illustrates a configuration example of a control system (a control system 1) according to an example embodiment of the disclosure. The control system 1 may be provided in a vehicle 100. In the present example embodiment, the vehicle 100 may be any vehicle such as an automobile. The control system 1 includes a central electronic control unit (ECU) 10, multiple electronic control units 19, and a communication module 20.

The central ECU 10 may be configured to control an operation of the vehicle 100 by controlling respective operations of the multiple electronic control units 19. Further, the central ECU 10 may be coupled via a connector such as a communication cable to a later-described diagnostic apparatus 30 provided outside the vehicle 100, to thereby communicate with the diagnostic apparatus 30. Furthermore, the central ECU 10 may be coupled to a controller area network (CAN) 9 to thereby communicate with the communication module 20 via the CAN 9.

The multiple electronic control units 19 may be configured to control operations of respective devices of the vehicle 100 in accordance with instructions from the central ECU 10. The multiple electronic control units 19 may include: an electronic control unit 19 that controls a power train such as an engine; an electronic control unit 19 that controls a steering device or a braking device; an electronic control unit 19 that controls devices such as doors, a wiper, or interior lights and exterior lights of the vehicle 100; an electronic control unit 19 that controls a driver assistance system; and any other electronic control unit 19 having a control functionality.

The communication module 20 may be configured to communicate with a base station through mobile communication such as 4th generation (4G) mobile communication or 5th generation (5G) mobile communication. This configuration may allow the communication module 20 to communicate via the base station with a later-described server 40 coupled to the Internet. Further, the communication module 20 may be coupled to the CAN 9 to thereby communicate via the CAN 9 with the central ECU 10.

The control system 1 may be configured to perform authentication processing between the central ECU 10 and the communication module 20. In some embodiments, an encrypted authentication key KB1 may be stored in a later-described nonvolatile memory 14 of the central ECU 10, and an encrypted authentication key KB2 may be stored in a later-described nonvolatile memory 24 of the communication module 20. The central ECU 10 and the communication module 20 may be configured to perform the authentication processing respectively using the authentication key KB1 and the authentication key KB2.

Figure 2:
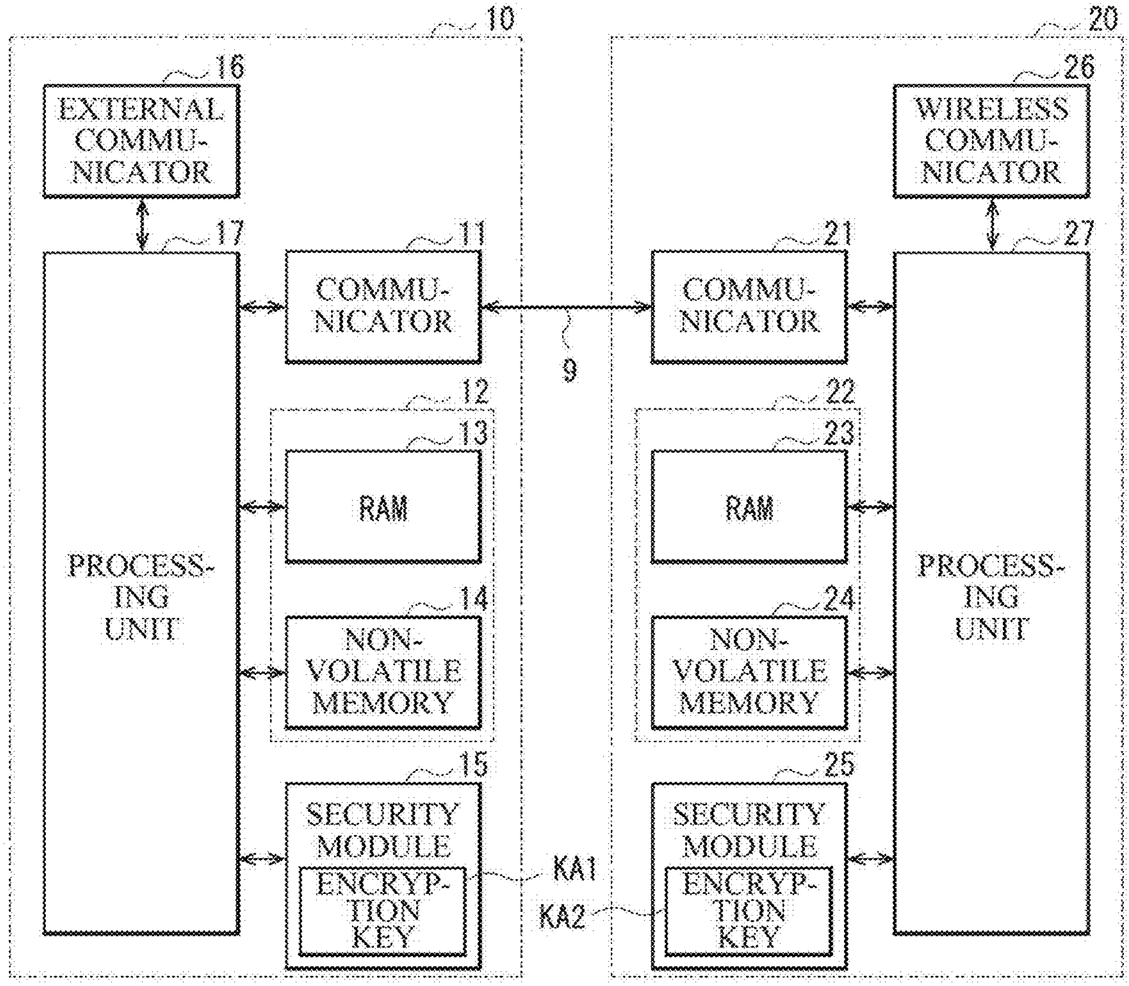
FIG. 2 is a block diagram illustrating a configuration example of a central electronic control unit and a communication module illustrated in FIG. 1.

FIG. 2 illustrates a configuration example of the central ECU 10 and the communication module 20.

The central ECU 10 may include a communicator 11, a storage 12, a security module 15, an external communicator 16, and a processing unit 17.

The communicator 11 may be configured to communicate with the communication module 20 via the CAN 9.

The storage 12 may be configured to hold data. The storage 12 may include a random-access memory (RAM) 13 and the nonvolatile memory 14. The RAM 13 may include a storage device such as a dynamic random-access memory (DRAM). The RAM 13 may be configured to temporarily hold processing content of the central ECU 10. The nonvolatile memory 14 may include a storage device such as a flash memory. The nonvolatile memory 14 may be configured to hold the encrypted authentication key KB1 and software to be executed by the central ECU 10. The RAM 13 and the nonvolatile memory 14 may have respective memory regions accessible by an external device provided outside the central ECU 10, via the communicator 11 and the processing unit 17.

In the present example embodiment, the security module 15 may be a hardware security module (HSM) configured to hold data in its secure memory region. In this example, the security module 15 holds an encryption key KA1. The security module 15 is configured to permit limited access from an external device provided outside the central ECU 10. This limited access may protect the data held in the security module 15 from unauthorized alteration or leakage.

For example, when an inconvenience occurs in the vehicle 100, the external communicator 16 may be configured to communicate with the later-described diagnostic apparatus 30 via the communication cable.

The processing unit 17 may include, for example, one or more processors. The processing unit 17 may be configured to control an operation of the central ECU 10 by executing the software.

The communication module 20 may include a communicator 21, a storage 22, a security module 25, a wireless communicator 26, and a processing unit 27.

The communicator 21 may be configured to communicate with the central ECU 10 via the CAN 9.

The storage 22 may be configured to hold data. The storage 22 may include a random-access memory (RAM) 23 and the nonvolatile memory 24. The RAM 23 may include a storage device such as a DRAM. The RAM 23 may be configured to temporarily hold processing content of the communication module 20. The nonvolatile memory 24 may include a storage device such as a flash memory. The nonvolatile memory 24 may be configured to hold the encrypted authentication key KB2 and software to be executed by the communication module 20. The RAM 23 and the nonvolatile memory 24 may have respective memory regions accessible by an external device provided outside the communication module 20, via the communicator 21 and the processing unit 27.

In the present example embodiment, the security module 25 may be a HSM configured to hold data in its secure memory region. In this example, the security module 25 holds an encryption key KA2. The security module 25 is configured to permit limited access from an external device provided outside the communication module 20. This limited access may protect the data held in the security module 25 from unauthorized alteration or leakage.

The wireless communicator 26 may be configured to communicate with the base station through mobile communication such as the 4G mobile communication or the 5G mobile communication. This configuration may allow the wireless communicator 26 to communicate via the base station with the later-described server 40 coupled to the Internet, to thereby download software such as update software from the server 40.

The processing unit 27 may include, for example, one or more processors. The processing unit 27 may be configured to control an operation of the communication module 20 by executing the software.

The central ECU 10 of the control system 1 generates an authentication key KB in accordance with an instruction from the diagnostic apparatus 30. Thereafter, the central ECU 10 transmits the authentication key KB to the communication module 20. The central ECU 10 generates the authentication key KB1 by encrypting the authentication key KB using the encryption key KA1, and stores the authentication key KB1 in the nonvolatile memory 14. Similarly, the communication module 20 generates the authentication key KB2 by encrypting the authentication key KB using the encryption key KA2, and stores the authentication key KB2 in the nonvolatile memory 24. After these operations, the central ECU 10 and the communication module 20 may be able to perform the authentication processing respectively using the authentication key KB1 stored in the nonvolatile memory 14 and the authentication key KB2 stored in the nonvolatile memory 24.

In one embodiment, the central ECU 10 may serve as a "first processor". In one embodiment, the encryption key KA1 may serve as a "first encryption key". In one embodiment, the security module 15 may serve as "first security circuitry". In one embodiment, the storage 12 may serve as "first storage circuitry". In one embodiment, the communication module 20 may serve as a "second processor". In one embodiment, the encryption key KA2 may serve as a "second encryption key". In one embodiment, the security module 25 may serve as "second security circuitry". In one embodiment, the storage 22 may serve as "second storage circuitry". In one embodiment, the authentication key KB may serve as an "authentication key". In one embodiment, the authentication key KB1 may serve as a "first authentication key". In one embodiment, the authentication key KB2 may serve as a "second authentication key".

Operation and Example Workings

An operation and example workings of the control system 1 according to the example embodiment will now be described.

(Overview of Overall Operation)

The operation of the control system 1 will first be described with reference to FIGS. 1 and 2. The communicator 11 of the central ECU 10 may communicate with the communication module 20 via the CAN 9. The storage 12 may hold data. The security module 15 may hold data in its secure memory region. The security module 15 holds the encryption key KA1. For example, when an inconvenience occurs in the vehicle 100, the external communicator 16 may communicate with the diagnostic apparatus 30 via the communication cable. The processing unit 17 may control the operation of the central ECU 10.

The communicator 21 of the communication module 20 may communicate with the central ECU 10 via the CAN 9. The storage 22 may hold data. The security module 25 may hold data in its secure memory region. The security module 25 holds the encryption key KA2. The wireless communicator 26 may communicate with the server 40 coupled to the Internet, via the base station through mobile communication, to thereby download software such as the update software from the server 40. The processing unit 27 may control the operation of the communication module 20.

(Details of Operation)

Hereinafter, the operation of the control system 1 will be described in detail.

The control system 1 may perform registration processing of registering the authentication key KB1 and the authentication key KB2 to be used for the authentication processing performed between the central ECU 10 and the communication module 20. Hereinafter, the registration processing will be described in detail.

Figure 3:
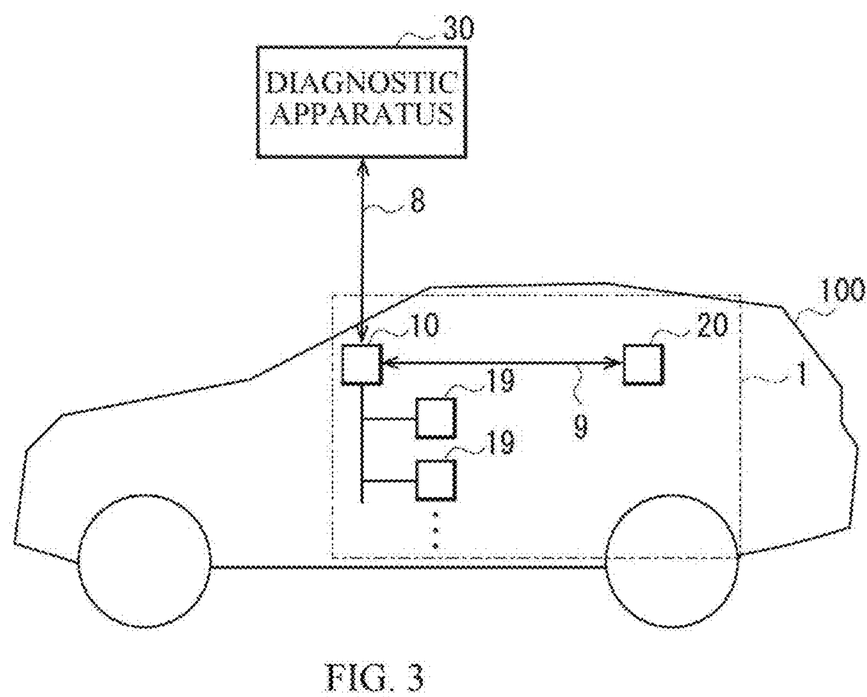
FIG. 3 is an explanatory diagram illustrating an operation example of the control system illustrated in FIG. 1.

FIG. 3 illustrates an example of the vehicle 100 in which the authentication key KB1 and the authentication key KB2 are to be stored. For example, when an inconvenience occurs in the vehicle 100, an owner of the vehicle 100 may bring the vehicle 100 into a car dealership. In this example, a mechanic at the car dealership may couple the diagnostic apparatus 30 to the central ECU 10 of the vehicle 100, whereby the diagnostic apparatus 30 may diagnose a condition of the vehicle 100. In the diagnosis in this example, the diagnostic apparatus 30 may detect a malfunction in the central ECU 10. Upon the diagnosis, the mechanic at the car dealership may replace the central ECU 10. In this case, in accordance with an instruction from the diagnostic apparatus 30, the control system 1 may register the authentication key KB1 and the authentication key KB2 to be used for the authentication processing performed between the central ECU 10 and the communication module 20.

Figure 4:
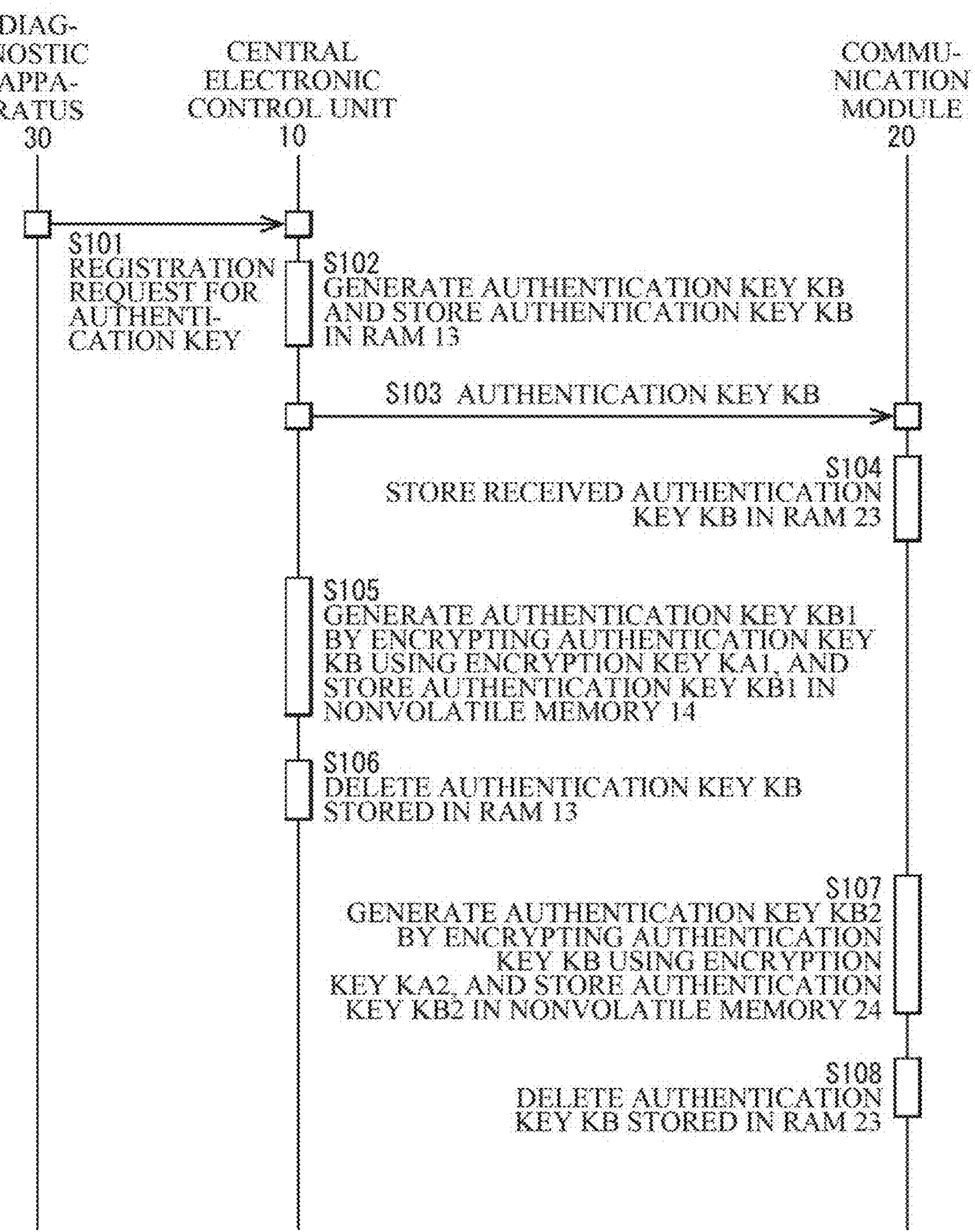
FIG. 4 is a sequence diagram illustrating the operation example of the control system illustrated in FIG. 3.

FIG. 4 illustrates an example of the registration processing of the authentication key KB1 and the authentication key KB2 in the control system 1.

First, the diagnostic apparatus 30 may transmit a registration request for the authentication key to the central ECU 10 of the vehicle 100 (step S101). The external communicator 16 of the central ECU 10 may receive the registration request from the diagnostic apparatus 30.

Thereafter, the processing unit 17 of the central ECU 10 generates the authentication key KB in accordance with the registration request for the authentication key having been received from the diagnostic apparatus 30, and stores the authentication key KB in the RAM 13 (step S102).

Thereafter, the communicator 11 of the central ECU 10 supplies the authentication key KB generated in step S102 to the communication module 20 (step S103). The communicator 21 of the communication module 20 may receive the authentication key KB from the communicator 11.

Thereafter, the processing unit 27 of the communication module 20 may store the received authentication key KB in the RAM 23 (step S104).

The processing unit 17 of the central ECU 10 generates the authentication key KB1 by encrypting the authentication key KB stored in the RAM 13 using the encryption key KA1 stored in the security module 15, and stores the authentication key KB1 in the nonvolatile memory 14 (step S105).

Thereafter, the processing unit 17 of the central ECU 10 may delete the authentication key KB stored in the RAM 13 (step S106).

Similarly, the processing unit 27 of the communication module 20 generates the authentication key KB2 by encrypting the authentication key KB stored in the RAM 23 using the encryption key KA2 stored in the security module 25, and stores the authentication key KB2 in the nonvolatile memory 24 (step S107).

Thereafter, the processing unit 27 of the communication module 20 may delete the authentication key KB stored in the RAM 23 (step S108).

Thereafter, the registration processing may end.

In this way, the authentication key KB1 encrypted using the encryption key KA1 is stored in the nonvolatile memory 14 of the central ECU 10, and the authentication key KB2 encrypted using the encryption key KA2 is stored in the nonvolatile memory 24 of the communication module 20.

After the registration processing, the central ECU 10 and the communication module 20 of the control system 1 may be able to perform the authentication processing using the authentication key KB1 and the authentication key KB2. Hereinafter, the authentication processing will be described.

Figure 5:
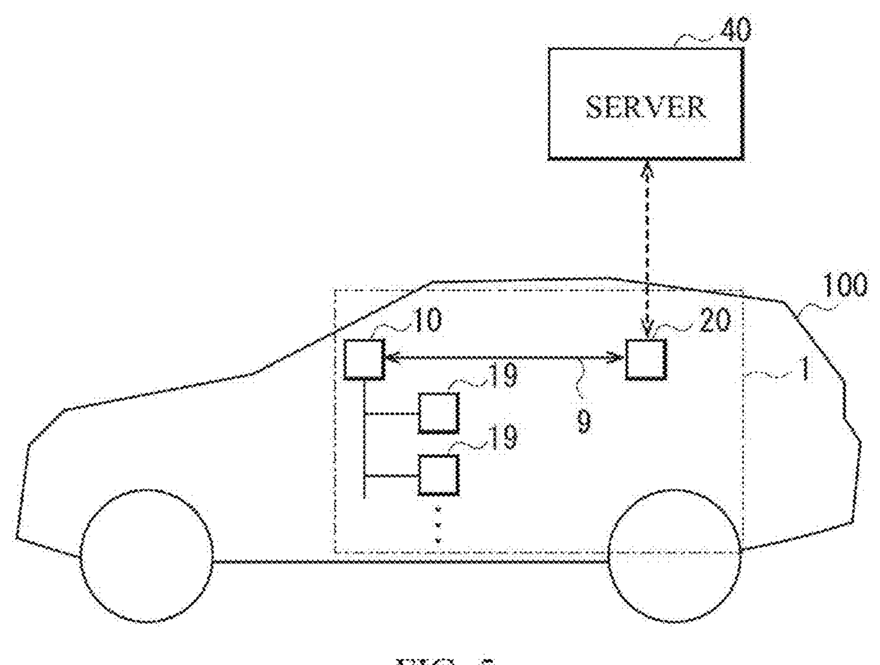
FIG. 5 is an explanatory diagram illustrating another operation example of the control system illustrated in FIG. 1.

FIG. 5 illustrates an example of the vehicle 100 to be subjected to the authentication processing using the authentication key KB1 and the authentication key KB2. For example, when the update software is prepared that updates software to be executed by one of the multiple electronic control units 19, the communication module 20 of the vehicle 100 may download the update software from the server 40. Thereafter, the central ECU 10 and the communication module 20 of the vehicle 100 may perform the authentication processing respectively using the authentication key KB1 and the authentication key KB2. When the central ECU 10 and the communication module 20 have successfully performed the authentication processing, the central ECU 10 may update the software for the relevant electronic control unit 19 in accordance with the update software.

Figure 6A:
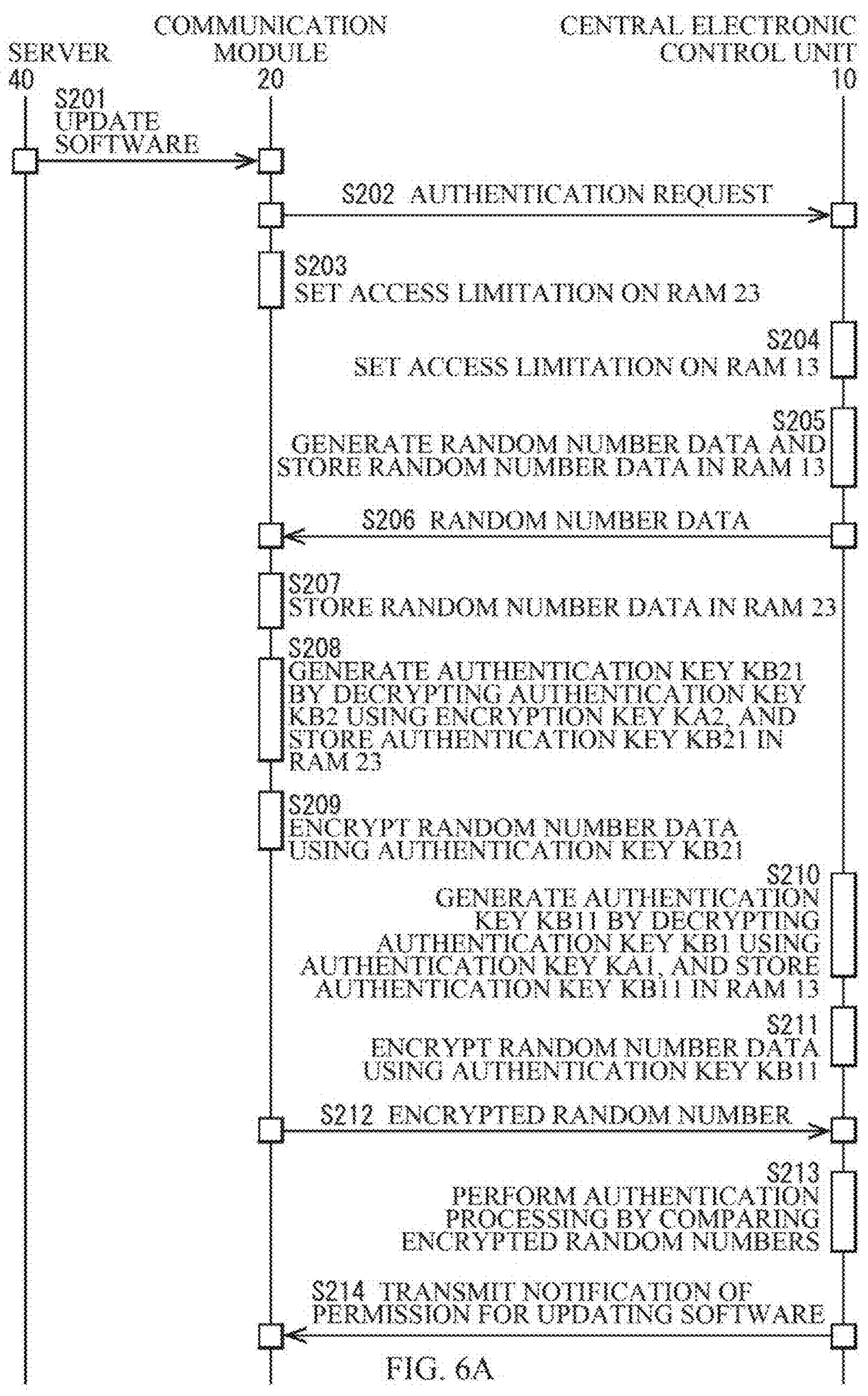
FIG. 6A is a sequence diagram illustrating the other operation example of the control system illustrated in FIG. 5.
Figure 6B:
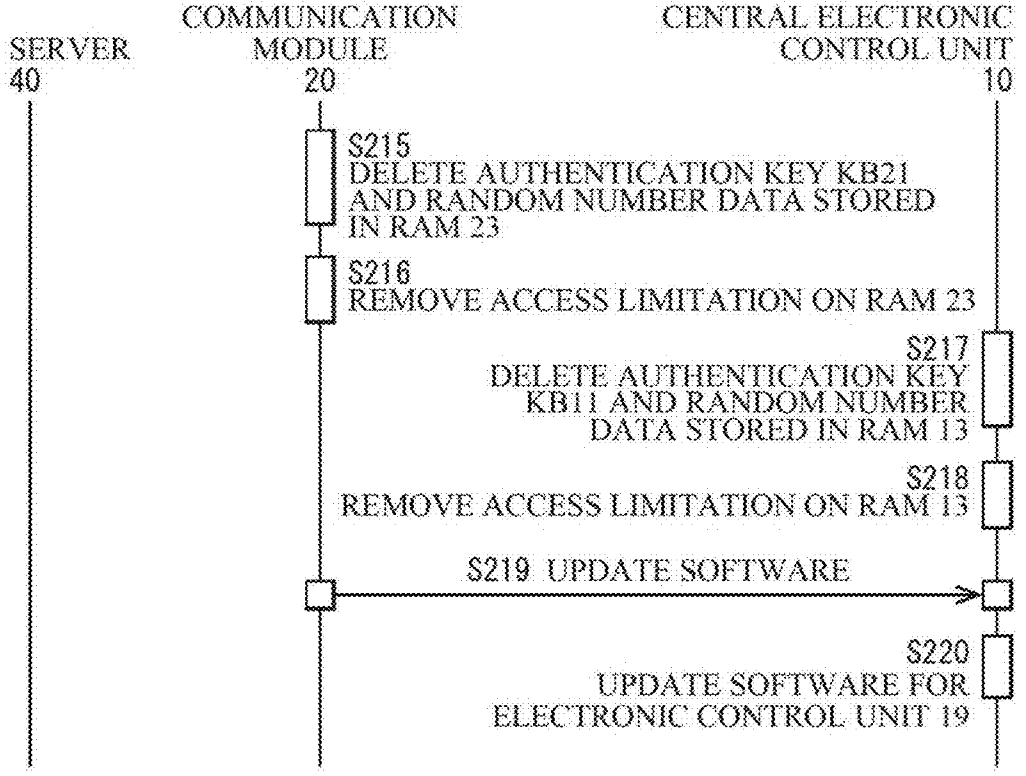
FIG. 6B is another sequence diagram illustrating the other operation example of the control system illustrated in FIG. 5.

FIGS. 6A and 6B each illustrate the authentication processing performed using the authentication key KB1 and the authentication key KB2 in the control system 1.

First, the server 40 may transmit the update software to the communication module 20 of the vehicle 100 (step S201). The wireless communicator 26 of the communication module 20 may receive the update software from the server 40.

Thereafter, the communicator 21 of the communication module 20 may transmit an authentication request to the central ECU 10 (step S202). The communicator 11 of the central ECU 10 may receive the authentication request from the communicator 21.

The processing unit 27 of the communication module 20 may set access limitation on the RAM 23 (step S203). This may temporarily limit access from a device such as an external device provided outside the communication module 20 to the memory region of the RAM 23.

Similarly, the processing unit 17 of the central ECU 10 may set access limitation on the RAM 13 (step S204). This may temporarily limit access from a device such as an external device provided outside the central ECU 10 to the memory region of the RAM 13.

Thereafter, the processing unit 17 of the central ECU 10 may generate random number data including a random number of multiple digits, and store the generated random number data in the RAM 13 (step S205).

Thereafter, the communicator 11 of the central ECU 10 may supply the random number data to the communication module 20 (step S206). The communicator 21 of the communication module 20 may receive the random number data from the communicator 11.

Thereafter, the processing unit 27 of the communication module 20 may store, in the RAM 23, the random number data received in step S206 (step S207).

Thereafter, the processing unit 27 of the communication module 20 may generate an authentication key KB21 by decrypting the authentication key KB2 stored in the nonvolatile memory 24 using the encryption key KA2 stored in the security module 25, and store the authentication key KB21 in the RAM 23 (step S208). The authentication key KB21 may be the same as the authentication key KB generated in step S102.

Thereafter, the processing unit 27 of the communication module 20 may encrypt the random number data stored in the RAM 23 in step S207 using the decrypted authentication key KB21 (step S209).

Similarly, the processing unit 17 of the central ECU 10 may generate an authentication key KB11 by decrypting the authentication key KB1 stored in the nonvolatile memory 14 using the encryption key KA1 stored in the security module 15, and store the authentication key KB11 in the RAM 13 (step S210). The authentication key KB11 may be the same as the authentication key KB generated in step S102.

Thereafter, the processing unit 17 of the central ECU 10 may encrypt the random number data stored in the RAM 13 in step S205 using the decrypted authentication key KB11 (step S211).

Thereafter, the communicator 21 of the communication module 20 may supply the random number data encrypted in step S209 to the central ECU 10 (step S212). The communicator 11 of the central ECU 10 may receive the encrypted random number data from the communicator 21.

Thereafter, the processing unit 17 of the central ECU 10 may perform the authentication processing by comparing the random number data encrypted in step S211 with the encrypted random number data received from the communication module 20 in step S212 (step S213). For example, when these pieces of the random number data are the same, the authentication key KB21 used by the communication module 20 may be the same as the authentication key KB11 used by the central ECU 10. Accordingly, the authentication processing may be performed by the processing unit 17 by comparing these pieces of the random number data with each other.

When the authentication processing is successful, the communicator 11 of the central ECU 10 may transmit a notification of permission for updating the software to the communication module 20 (step S214). The communicator 21 of the communication module 20 may receive the notification from the communicator 11.

Thereafter, the processing unit 27 of the communication module 20 may delete the authentication key KB21 and the random number data that are stored in the RAM 23 (step S215). Thereafter, the processing unit 27 of the communication module 20 may remove the access limitation set on the RAM 23 in step S203 (step S216). This may permit access from a device such as an external device provided outside the communication module 20 to the memory region of the RAM 23.

Similarly, the processing unit 17 of the central ECU 10 may delete the authentication key KB11 and the random number data that are stored in the RAM 13 (step S217). Thereafter, the processing unit 17 of the central ECU 10 may remove the access limitation set on the RAM 13 in step S204 (step S218). This may permit access from a device such as an external device provided outside the central ECU 10 to the memory region of the RAM 13.

Thereafter, the communicator 21 of the communication module 20 may supply the update software received in step S201 to the central ECU 10 (step S219). The communicator 11 of the central ECU 10 may receive the update software from the communicator 21.

Thereafter, the processing unit 17 of the central ECU 10 may update the software to be updated for the electronic control unit 19, in accordance with the update software received in step S219 (step S220).

Thereafter, the authentication processing may end. In one embodiment, the authentication key KB11 may serve as a "third authentication key". In one embodiment, the authentication key KB21 may serve as a "fourth authentication key".

As described above, the control system 1 includes the central ECU 10 and the communication module 20. The central ECU 10 includes the first security circuitry (the security module 15) and the first storage circuitry (the storage 12). The first security circuitry is configured to hold the first encryption key (the encryption key KA1) and permit limited access from an external device. The communication module 20 includes the second security circuitry (the security module 25) and the second storage circuitry (the storage 22). The second security circuitry is configured to hold the second encryption key (the encryption key KA2) and permit limited access from the external device. The central ECU 10 is configured to generate the authentication key KB to be used for the authentication processing performed between the central ECU 10 and the communication module 20. The central ECU 10 is configured to generate the first authentication key (the authentication key KB1) by encrypting the authentication key KB using the first encryption key (the encryption key KA1). The central ECU 10 is configured to store the first authentication key (the authentication key KB1) in the first storage circuitry (the storage 12). The central ECU 10 is configured to supply the authentication key KB to the communication module 20. The communication module 20 is configured to generate the second authentication key (the authentication key KB2) by encrypting the authentication key KB supplied from the central ECU 10 using the second encryption key (the encryption key KA2). The communication module 20 is configured to store the second authentication key (the authentication key KB2) in the second storage circuitry (the storage 22). Such a configuration helps to achieve the high convenience of the control system 1 while enhancing security of the control system 1.

Meanwhile, another conceivable method for increasing security involves storing the respective generated authentication keys in the security module 15 and the security module 25. This method, however, necessitates the diagnostic apparatus 30 using the encryption key KA1 stored in the security module 15 when storing the authentication key in the security module 15, for example. In other words, this method necessitates the diagnostic apparatus 30 holding the encryption key KA1. Such a configuration necessitates the diagnostic apparatus 30 managing respective encryption keys KA1 of multiple vehicles 100. This increases a management cost and impairs the convenience of the control system 1.

In contrast, the control system 1 according to the present example embodiment generates the authentication key KB1 by encrypting the authentication key KB using the encryption key KA1 stored in the security module 15, and stores the authentication key KB1 in the storage 12 rather than the security module 15. Similarly, the control system 1 generates the authentication key KB2 by encrypting the authentication key KB using the encryption key KA2 stored in the security module 25, and stores the authentication key KB2 in the storage 22 rather than the security module 25. Such a configuration helps to eliminate necessity for the diagnostic apparatus 30 to hold the encryption key KA1 and the encryption key KA2. This helps to decrease the management cost and achieve the high convenience of the control system 1.

In some embodiments, the central ECU 10 of the control system 1 may be configured to temporarily store the authentication key (the authentication key KB) in the first storage circuitry (the storage 12). After the first authentication key (the authentication key KB1) is stored in the first storage circuitry (the storage 12), the central ECU 10 may be configured to delete the authentication key (the authentication key KB) stored in the first storage circuitry (the storage 12). The communication module 20 may be configured to temporarily store the authentication key (the authentication key KB) supplied from the central ECU 10 in the second storage circuitry (the storage 22). After the second authentication key (the authentication key KB2) is stored in the second storage circuitry (the storage 22), the communication module 20 may be configured to delete the authentication key (the authentication key KB) stored in the second storage circuitry (the storage 22). Accordingly, the encrypted authentication key KB1 may be stored in and the unencrypted authentication key KB may be deleted from the storage 12 of the control system 1, and the encrypted authentication key KB2 may be stored in and the unencrypted authentication key KB may be deleted from the storage 22 of the control system 1. This helps to enhance the security of the control system 1.

In some embodiments, the central ECU 10 of the control system 1 may be configured to generate the authentication key KB in accordance with the instruction from the diagnostic apparatus 30. For example, even when a malfunction occurs in the central ECU 10, the central ECU 10 may generate the authentication key KB in accordance with the instruction from the diagnostic apparatus 30. Such a configuration allows the central ECU 10 to generate a new authentication key KB instead of continuously using the previous authentication key KB, for example. This helps to enhance the security of the control system 1.

In some embodiments, the central ECU 10 of the control system 1 may be configured to generate the third authentication key (the authentication key KB11) by decrypting the first authentication key (the authentication key KB1) using the first encryption key (the encryption key KA1). The central ECU 10 may be configured to perform first processing using the third authentication key (the authentication key KB11). Further, the communication module 20 may be configured to generate the fourth authentication key (the authentication key KB21) by decrypting the second authentication key (the authentication key KB2) using the second encryption key (the encryption key KA2). The communication module 20 may be configured to perform second processing using the fourth authentication key (the authentication key KB21).

Furthermore, the central ECU 10 and the communication module 20 may perform the authentication processing by performing the first processing and the second processing, respectively. For example, when the authentication key KB11 and the authentication key KB21 are the same, the authentication processing may be successful. When the authentication processing is successful, predetermined processing may be performed. This helps to enhance the security of the control system 1.

Example Effects

In the foregoing example embodiment, the control system includes the central ECU and the communication module. The central ECU includes the first security circuitry and the first storage circuitry. The first security circuitry is configured to hold the first encryption key and permit limited access from an external device. The communication module includes the second security circuitry and the second storage circuitry. The second security circuitry is configured to hold the second encryption key and permit limited access from the external device. The central ECU is configured to generate the authentication key to be used for the authentication processing performed between the central ECU and the communication module. The central ECU is configured to generate the first authentication key by encrypting the authentication key using the first encryption key. The central ECU is configured to store the first authentication key in the first storage circuitry. The central ECU is configured to supply the authentication key to the communication module. The communication module is configured to generate the second authentication key by encrypting the authentication key supplied from the central ECU using the second encryption key. The communication module is configured to store the second authentication key in the second storage circuitry.

Such a configuration helps to achieve the high convenience of the control system while enhancing the security of the control system.

In some embodiments, the central ECU may be configured to temporarily store the authentication key in the first storage circuitry. After the first authentication key is stored in the first storage circuitry, the central ECU may be configured to delete the authentication key stored in the first storage circuitry. The communication module may be configured to temporarily store the authentication key supplied from the central ECU in the second storage circuitry. After the second authentication key is stored in the second storage circuitry, the communication module may be configured to delete the authentication key stored in the second storage circuitry. Such a configuration helps to enhance the security of the control system.

In some embodiments, the central ECU may be configured to generate the authentication key in accordance with an instruction from an external apparatus. Such a configuration helps to enhance the security of the control system.

In some embodiments, the central ECU may be configured to generate the third authentication key by decrypting the first authentication key using the first encryption key. The central ECU may be configured to perform the first processing using the third authentication key. The communication module may be configured to generate the fourth authentication key by decrypting the second authentication key using the second encryption key. The communication module may be configured to perform the second processing using the fourth authentication key. The central ECU and the communication module may be configured to perform the authentication processing by performing the first processing and the second processing, respectively. Such a configuration helps to enhance the security of the control system.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

According to the foregoing example embodiment, the authentication processing may be performed by the method illustrated in FIGS. 6A and 6B; however, this is a non-limiting example.

In some embodiments, any authentication method may be employed as long as the authentication key KB1 stored in the storage 12 of the central ECU 10 and the authentication key KB2 stored in the storage 22 of the communication module 20 are used.

According to the foregoing example embodiment, the authentication processing may be performed by the central ECU 10 and the communication module 20; however, this is a non-limiting example. In some embodiments, the authentication processing may be performed by various other kinds of circuitry of the vehicle 100.

According to the foregoing example embodiment, the technology of an embodiment of the disclosure may be applied to the vehicle 100; however, this is a non-limiting example. In some embodiments, the technology of an embodiment of the disclosure may be applied to any other device or system than the vehicle 100.

The example effects described herein are merely exemplary, and example effects of any embodiment of the disclosure are therefore not limited to those described herein. Accordingly, any embodiment of the disclosure may achieve any other example effects.

The limitations in the claims are to be interpreted broadly based on the language employed in the claims and not limited to examples described in this specification or during the prosecution of the application, and the examples are to be construed as non-exclusive.

As used in this specification and the appended claims, the singular forms "a", "an", and "the" include, especially in the context of the claims, are to be construed to cover both the singular and the plural, unless otherwise indicated herein or clearly contradicted by context.

Throughout this specification and the appended claims, unless the context requires otherwise, the terms "comprise", "include", "have", and their variations are to be construed to cover the inclusion of a stated element, integer, or step but not the exclusion of any other non-stated element, integer, or step.

The use of the terms first, second, etc. do not denote any order or importance, but rather the terms first, second, etc. are used to distinguish one element from another.

The term "substantially", "approximately", "about", and its variants having the similar meaning thereto are defined as being largely but not necessarily wholly what is specified as understood by one of ordinary skill in the art.

The term "disposed on/provided on/formed on" and its variants having the similar meaning thereto as used herein refer to elements disposed directly in contact with each other or indirectly by having intervening structures therebetween.

At least the following configurations are achievable from the foregoing example embodiment.

(1) A control system including:

a first processor including first security circuitry and first storage circuitry, the first security circuitry being configured to hold a first encryption key and permit limited access from an external device; and a second processor including second security circuitry and second storage circuitry, the second security circuitry being configured to hold a second encryption key and permit limited access from the external device, in which the first processor is configured to generate an authentication key to be used for authentication processing performed between the first processor and the second processor, the first processor is configured to generate a first authentication key by encrypting the authentication key using the first encryption key, the first processor is configured to store the first authentication key in the first storage circuitry, the first processor is configured to supply the authentication key to the second processor, the second processor is configured to generate a second authentication key by encrypting the authentication key supplied from the first processor using the second encryption key, and the second processor is configured to store the second authentication key in the second storage circuitry.

(2) The control system according to (1), in which the first processor is configured to temporarily store the authentication key in the first storage circuitry, after the first authentication key is stored in the first storage circuitry, the first processor is configured to delete the authentication key stored in the first storage circuitry, the second processor is configured to temporarily store the authentication key supplied from the first processor in the second storage circuitry, and after the second authentication key is stored in the second storage circuitry, the second processor is configured to delete the authentication key stored in the second storage circuitry.

(3) The control system according to (1) or (2), in which the first processor is configured to generate the authentication key in accordance with an instruction from an external apparatus.

(4) The control system according to any one of (1) to (3), in which the first processor is configured to generate a third authentication key by decrypting the first authentication key using the first encryption key, the first processor is configured to perform first processing using the third authentication key, the second processor is configured to generate a fourth authentication key by decrypting the second authentication key using the second encryption key, the second processor is configured to perform second processing using the fourth authentication key, and the first processor and the second processor are configured to perform the authentication processing by performing the first processing and the second processing, respectively.

(5) A vehicle including the control system according to any one of (1) to (4), in which the first processor includes an electronic control unit configured to control the vehicle.

The processing unit 17 and the processing unit 27 illustrated in FIG. 2 are each implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the processing unit 17 and the processing unit 27 illustrated in FIG. 2. Such a medium may take many forms, including, but not limited to, any type of magnetic medium such as a hard disk, any type of optical medium such as a CD and a DVD, any type of semiconductor memory (i.e., semiconductor circuit) such as a volatile memory and a nonvolatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the processing unit 17 and the processing unit 27 illustrated in FIG. 2.

The invention claimed is:

1. A vehicle comprising:

a control system comprising:

a first processor comprising first security circuitry and first storage circuitry, the first security circuitry being configured to hold a first encryption key and permit limited access from an external device; and a second processor comprising second security circuitry and second storage circuitry, the second security circuitry being configured to hold a second encryption key and permit limited access from the external device, wherein the first processor comprises an electronic control unit configured to control the vehicle, the first processor is configured to generate an authentication key to be used for authentication processing performed between the first processor and the second processor, in accordance with an instruction from an external apparatus, the first processor is configured to temporarily store the authentication key in the first storage circuitry, the first processor is configured to supply the authentication key to the second processor, the first processor is configured to generate a first authentication key by encrypting the authentication key using the first encryption key, the first processor is configured to store the first authentication key in the first storage circuitry, the first processor is configured to, after the first authentication key is stored in the first storage circuitry, delete the authentication key stored in the first storage circuitry, the second processor is configured to temporarily store the authentication key supplied from the first processor in the second storage circuitry, the second processor is configured to generate a second authentication key by encrypting the authentication key supplied from the first processor using the second encryption key, the second processor is configured to store the second authentication key in the second storage circuitry, and the second processor is configured to, after the second authentication key is stored in the second storage circuitry, delete the authentication key stored in the second storage circuitry.

2. The vehicle according to claim 1, wherein the first processor is configured to generate a third authentication key by decrypting the first authentication key using the first encryption key, the first processor is configured to perform first processing using the third authentication key, the second processor is configured to generate a fourth authentication key by decrypting the second authentication key using the second encryption key, the second processor is configured to perform second processing using the fourth authentication key, and the first processor and the second processor are configured to perform the authentication processing by performing the first processing and the second processing, respectively.

* * * * *